United States Patent [19]

Cornell

[11] 3,730,015
[45] May 1, 1973

[54] TORSIONAL ELASTOMER SNUBBER
[75] Inventor: Robert W. Cornell, West Hartford, Conn.
[73] Assignee: United Aircraft Corporation, East Hartford, Conn.
[22] Filed: Sept. 16, 1971
[21] Appl. No.: 181,127

[52] U.S. Cl. ............................................74/424.8 R
[51] Int. Cl. ................................................F16h 1/18
[58] Field of Search ..................................74/424.8 R

[56] References Cited

UNITED STATES PATENTS 3,640,183  2/1972  Koch et al..........................74/424.8 R Primary Examiner—Leonard H. Gerin
Attorney—Norman Friedland

[57] ABSTRACT

The torsional energy of a rotational member occasioned by its deceleration to a complete stop is absorbed by an elastomer sandwiched between concentric shafts such that the elastomer is placed in radial shear.

6 Claims, 4 Drawing Figures

Patented May 1, 1973
3,730,015
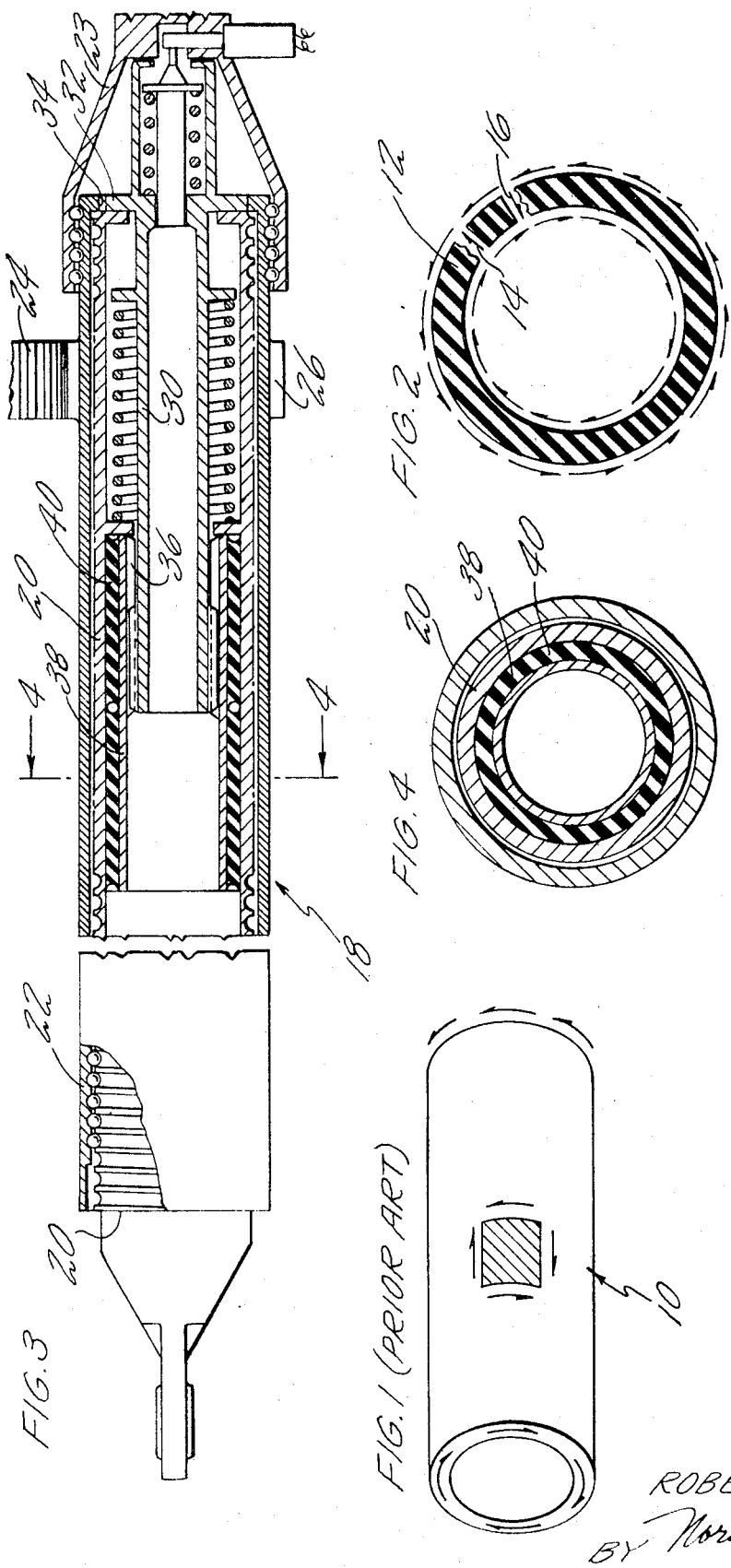

3,730,015

TORSIONAL ELASTOMER SNUBBER

BACKGROUND OF THE INVENTION

This invention relates to torque tubes and particularly to a torsional elastomer snubber.

As is well known, it is common practice in screw type actuators to utilize snubbers which serve to absorb the energy of the motor and the inertia of the system when a large deceleration is evidenced as is occasioned in stopping the screw from rotating The snubber is utilized to absorb the energy so as to avoid rupturing the component parts. The customary approach in absorbing this energy is by utilizing a metal torque tube which is placed in longitudinal shear.

I have found that I can obviate the disadvantage of a metal torque tube which is namely that it is heavy, expensive and large, by utilizing an elastomer such as rubber and placing it in radial shear rather than longitudinal shear so as to absorb the energy and to control the torsional deflection.

SUMMARY OF THE INVENTION

The primary object of this invention is to utilize a torsional elastomer snubber for a screw type actuator which is placed in radial shear.

A still further object of this invention is to provide an elastomer snubber that is characterized as being compact, light in weight and inexpensive to fabricate.

Other features and advantages will be apparent from the specification and claims and from the accompanying drawings which illustrate an embodiment of the invention.

BRIEF DESCRIPTION OF THE DRAWING

FIG. 1 is a view in perspective illustrating the forces of a torque tube that is in longitudinal shear.

FIG. 2 is a sectional view illustrating the forces of the present invention of a torsional elastomer snubber that is in radial shear.

FIG. 3 is a view in elevation and partly in section illustrating the invention in its preferred embodiment.

FIG. 4 is a sectional view taken along lines 4—4 of FIG. 3.

DESCRIPTION OF THE PREFERRED EMBODIMENT

To get a fuller understanding of this invention, reference is hereby made to FIGS. 1 and 2 where FIG. 1 shows the conventional torque tube and FIG. 2 shows the present invention. The arrows illustrate the forces when a torsional load is imparted to the snubber and in the conventional prior art torque tube the torsional load tends to twist the material. Thus, as illustrated by the arrows going in a clockwise and counterclockwise direction at either end, torque tube 10 tends to twist about its longitudinal axis placing the material in longitudinal shear. In constrast, as is exemplified by the elastomer illustrated in FIG. 2 which is formed in a hollow cylinder, the torsional load is imparted through either the inner or outer diameter so that a radial shear illustrated by the arrows 14 and 16 is evidenced. By selecting an elastomer with a low modulus of elasticity and good damping characteristics, the torsional energy can be absorbed in a small volume and partially dissipated rather than completely stored elastically as would be the case in a long, high modulus metal torque tube, thus resulting in a design that is compact, light and inexpensive as well as avoiding structural instability and vibratory problems that are generally occasioned with the use of long, metal torque tubes or rods.

Reference is next made to FIGS. 3 and 4 illustrating the invention as utilized in its preferred embodiment. A ball-screw actuator is generally illustrated by numberal 18 as comprising a screw member 20 and an elongated rotatable nut member 22 journaled in fixed member 23. Rotation of the nut 22 by gears 24 and 26 serves to move the screw 20 in a rectilinear direction. Ball-screw actuators are well known and a detailed description thereof is omitted herefrom thus for the sake of clarity and simplicity. Suffice it to say that the screw member 20 does not rotate and moves in and out of the elongated nut 22 which movement may be utilized to position, as for example, the wings of an aircraft.

Such mechanism employs stop devices in order to stop the screw at a predetermined position. The purpose of the snubber is obviously to absorb the energy if the stopping results in a large torsional load.

The snubber stop consists of an elongated shaft 30 concentrically supported relative to screw 20. A pair of tangs or ears 32 carried by shaft 30 serve to engage depending shoulders 34 formed on the end of nut 22.

It is apparent from the foregoing that nut 22 rotates relative to screw 20 and screw 20 moves axially with respect to nut 22. If for some reason the tang 32 hits shoulder 34 with sufficient impact, the torsional force will be transmitted through shaft 30, spline 36, tubular member 38 to elastomer 40.

The elastomer snubber 40 is fabricated from a suitable low modulus of elasticity material such as rubber and is volcanized or cemented to the inside diameter of screw 20 and the outside diameter of tubular member 38. The elastomer 40, tube 38 and screw 20 are formed into an integral unit, resulting in a compact, light and relatively inexpensive unit.

It should be understood that the invention is not limited to the particular embodiments shown and described herein, but that various changes and modifications may be made without departing from the spirit or scope of this novel concept as defined by the following.

I claim:

1. A snubber for an actuator of the type that includes a rotary member that translates a nonrotating member and also includes means for stopping movement of said rotary member, said rotating member and said nonrotating member being concentrically disposed relative to each other and being spaced from each other, said snubber including an elongated tubular member fabricated from an elastomeric material disposed in said space between said stopping means in the rotary member and said nonrotating member such that the torsional load imparted by said stopping means is absorbed by said snubber and said elastomeric material is placed in radial shear.

2. A snubber as claimed in claim 1 in which said elastomeric material is rubber.

3. A snubber as claimed in claim 1 in which said nonrotary member is an elongated screw, said snubber being disposed in a bore of said elongated screw and the outer diameter of the said elongated tubular member being attached to said inner diameter of said elongated screw.

4. A snubber as claimed in claim 3 including a cylindrical hollow shaft having its outer diameter attached to the inner diameter of said tubular elongated member, and means on said shaft for receiving the torsional load transmitted by said stopping means.

5. For an actuator of the type that transduces rotary motion from one member to rectilinear movement to another nonrotating member and means for abruptly stopping said movement, said rotating member and said nonrotating member being concentrically disposed about an axis, but being spaced from each other, snubber means including a tubular shaped elastomer member in said space having its inner and outer diameter attached to said rotating member and said nonrotating member of said actuator so that the torsional load occasioned by said abrupt stopping is absorbed by said elastomer by placing said elastomer in radial shear.

6. For an actuator of the type that transduces rotary motion from one member to rectilinear movement to another nonrotary member and means for abruptly stopping said movement, the improvement comprising snubber means including a cylindrically shaped hollow elastomer member, a torsional drive shaft concentric to but spaced from said nonrotary member for transmitting the torsional load to the snubber from said stopping means, said cylindrically shaped hollow elastomer member being sandwiched between said torsional drive shaft and said nonrotary member in said space and being bonded thereto to form a substantially integral member, so that said elastomer is placed in radial shear upon absorption of a torsional load.

* * * * *